United States Patent
Walley

(10) Patent No.: US 9,938,972 B2
(45) Date of Patent: Apr. 10, 2018

(54) DISTRIBUTOR APPARATUS WITH A PAIR OF INTERMESHING SCREW ROTORS

(71) Applicant: FISH ENGINEERING LIMITED, Cheshire (GB)

(72) Inventor: David Michael Walley, Cheshire (GB)

(73) Assignee: FISH ENGINEERING LIMITED, Crewe (GB)

( * ) Notice: Subject to any disclaimer, the term of this patent is extended or adjusted under 35 U.S.C. 154(b) by 267 days.

(21) Appl. No.: 14/911,252

(22) PCT Filed: Aug. 18, 2014

(86) PCT No.: PCT/GB2014/052523
§ 371 (c)(1),
(2) Date: Feb. 9, 2016

(87) PCT Pub. No.: WO2015/025140
PCT Pub. Date: Feb. 26, 2015

(65) Prior Publication Data
US 2016/0186750 A1   Jun. 30, 2016

(30) Foreign Application Priority Data
Aug. 19, 2013   (GB) .................................. 1314774.9

(51) Int. Cl.
*F04C 15/06*      (2006.01)
*F04C 2/16*       (2006.01)
(Continued)

(52) U.S. Cl.
CPC ................ *F04C 2/16* (2013.01); *A22C 11/08* (2013.01); *A23P 10/00* (2016.08); *F04C 11/001* (2013.01);
(Continued)

(58) Field of Classification Search
CPC .. F04C 13/00; F04C 15/06; F04C 2/16; F04C 2240/70
(Continued)

(56) References Cited

U.S. PATENT DOCUMENTS 3,693,601 A * 9/1972 Sauder ...................... F01C 1/16
123/203
5,192,199 A * 3/1993 Olofsson ................. F04C 18/16
417/406

(Continued)

FOREIGN PATENT DOCUMENTS

DE        1900567 A1    8/1970
DE        19820622 A1   11/1999
(Continued)

OTHER PUBLICATIONS

"International Search Report and Written Opinion" for PCT/GB2014/052523, dated Dec. 4, 2012, 14 pages.
(Continued)

*Primary Examiner* — Mark Laurenzi
*Assistant Examiner* — Dapinder Singh
(74) *Attorney, Agent, or Firm* — Han Santos, PLLC; Elliott Y. Chen

(57) ABSTRACT

A distributor apparatus 10 for distributing a plurality of portions or streams of a flowable material. The apparatus 10 comprises an enclosure 16 which locates rotors 48, 50. An inlet port 66 is provided in an upper part of the enclosure, which connects to a manifold 34 with five spaced inlets 36 through which material can pass to drive the rotors 48, 50. Material can pass round the rotors 48, 50 to a plurality of spaced outlets 38 for discharging to and from the apparatus 10.

18 Claims, 20 Drawing Sheets

(51) Int. Cl.
  *A22C 11/08* (2006.01)
  *F04C 11/00* (2006.01)
  *F04C 13/00* (2006.01)
  *A23P 10/00* (2016.01)
(52) U.S. Cl.
  CPC .............. *F04C 13/00* (2013.01); *F04C 15/06* (2013.01); *F04C 2240/70* (2013.01)
(58) Field of Classification Search
  USPC .............................................. 418/201.1, 197
  See application file for complete search history.

(56) References Cited

U.S. PATENT DOCUMENTS

| | | | |
|---|---|---|---|
| 5,871,340 A | 2/1999 | Hatton | |
| 6,174,440 B1* | 1/2001 | Charron | B01D 53/14 |
| | | | 210/101 |
| 6,185,956 B1* | 2/2001 | Brasz | F04C 23/003 |
| | | | 417/391 |

FOREIGN PATENT DOCUMENTS

| | | |
|---|---|---|
| JP | H04345416 A | 12/1992 |
| WO | 9835135 A1 | 8/1998 |

OTHER PUBLICATIONS

"Search Report Under Section 17" for GB1414599.9, dated Sep. 17, 2014, 1 page.

\* cited by examiner

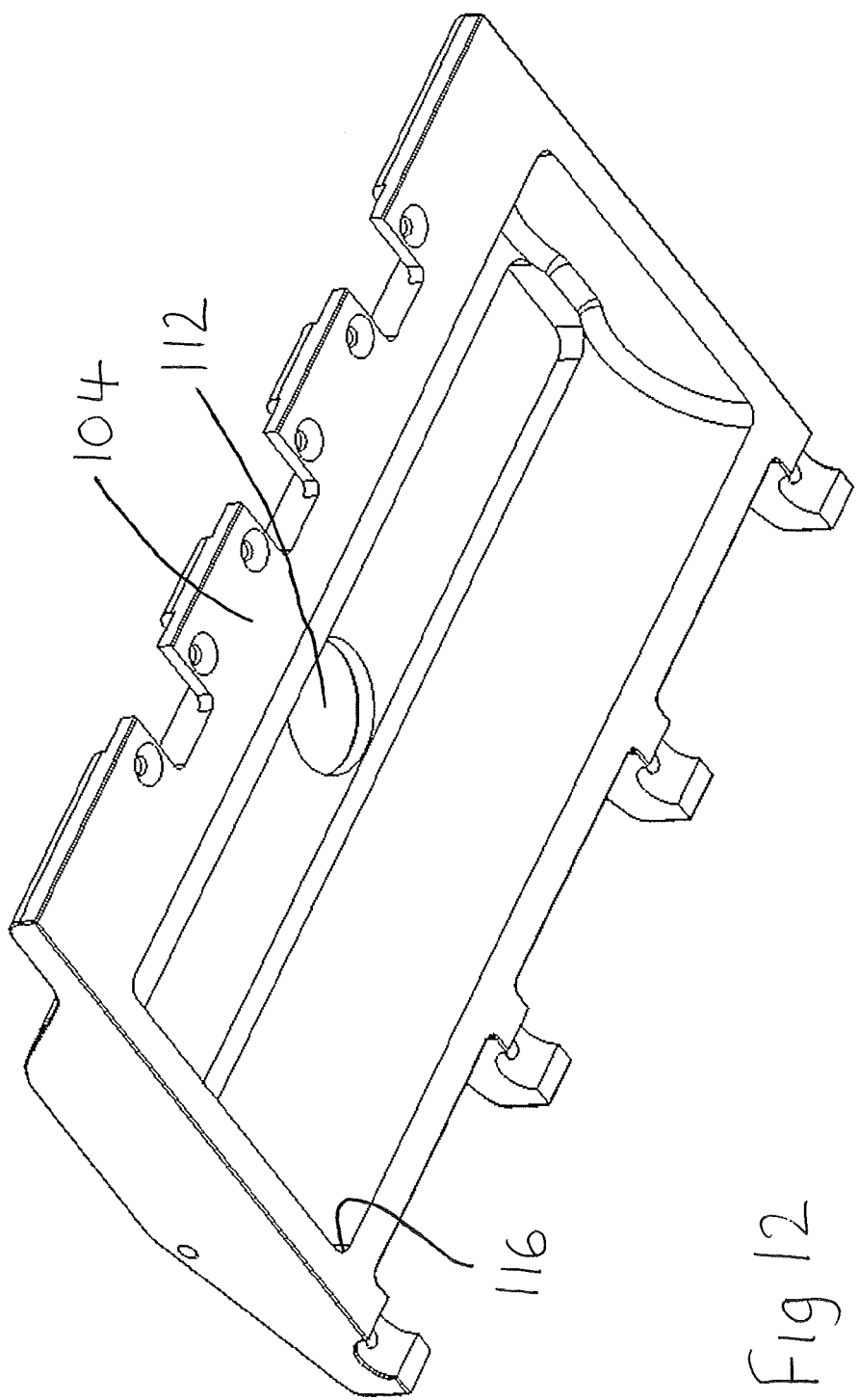

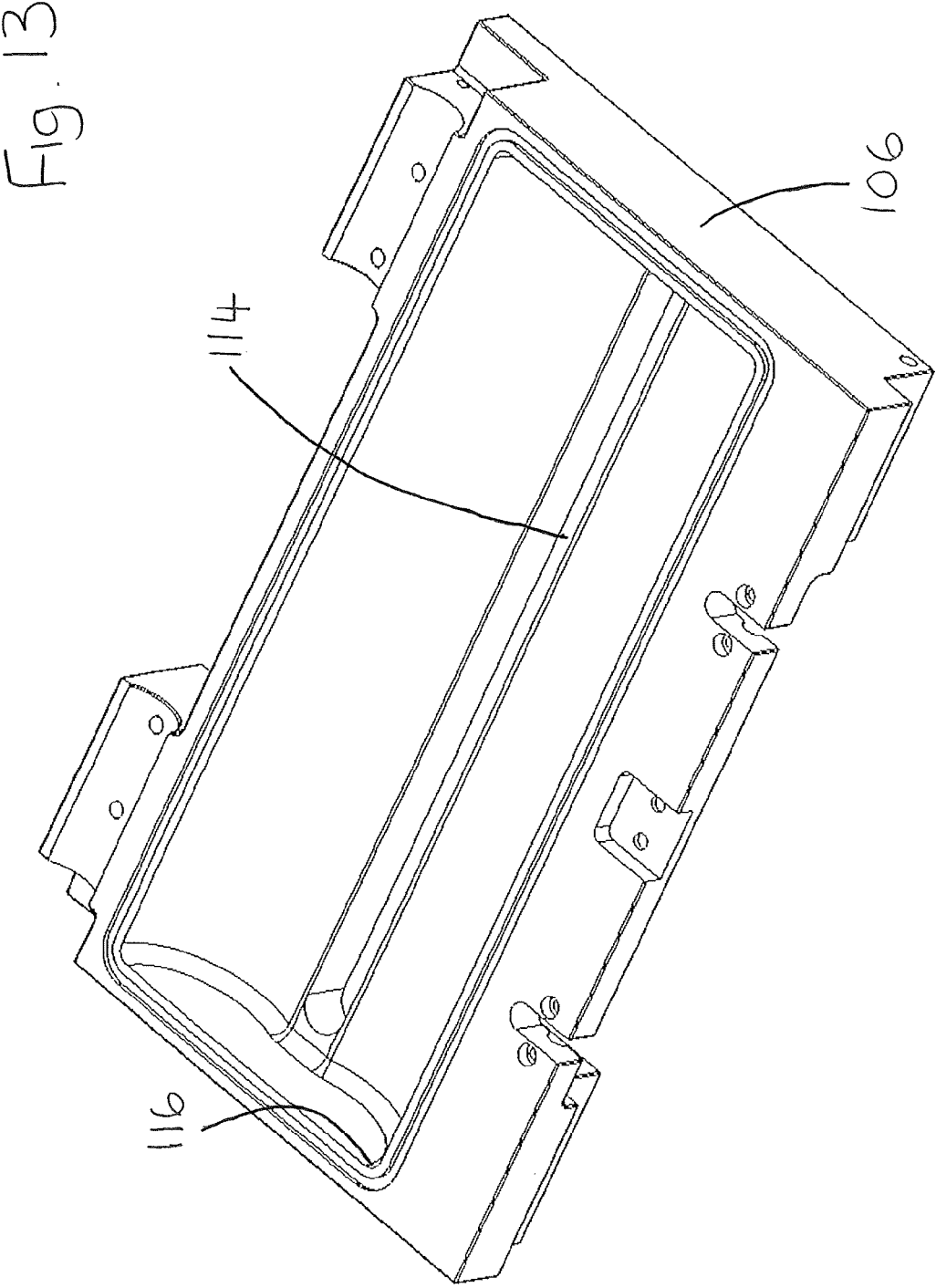

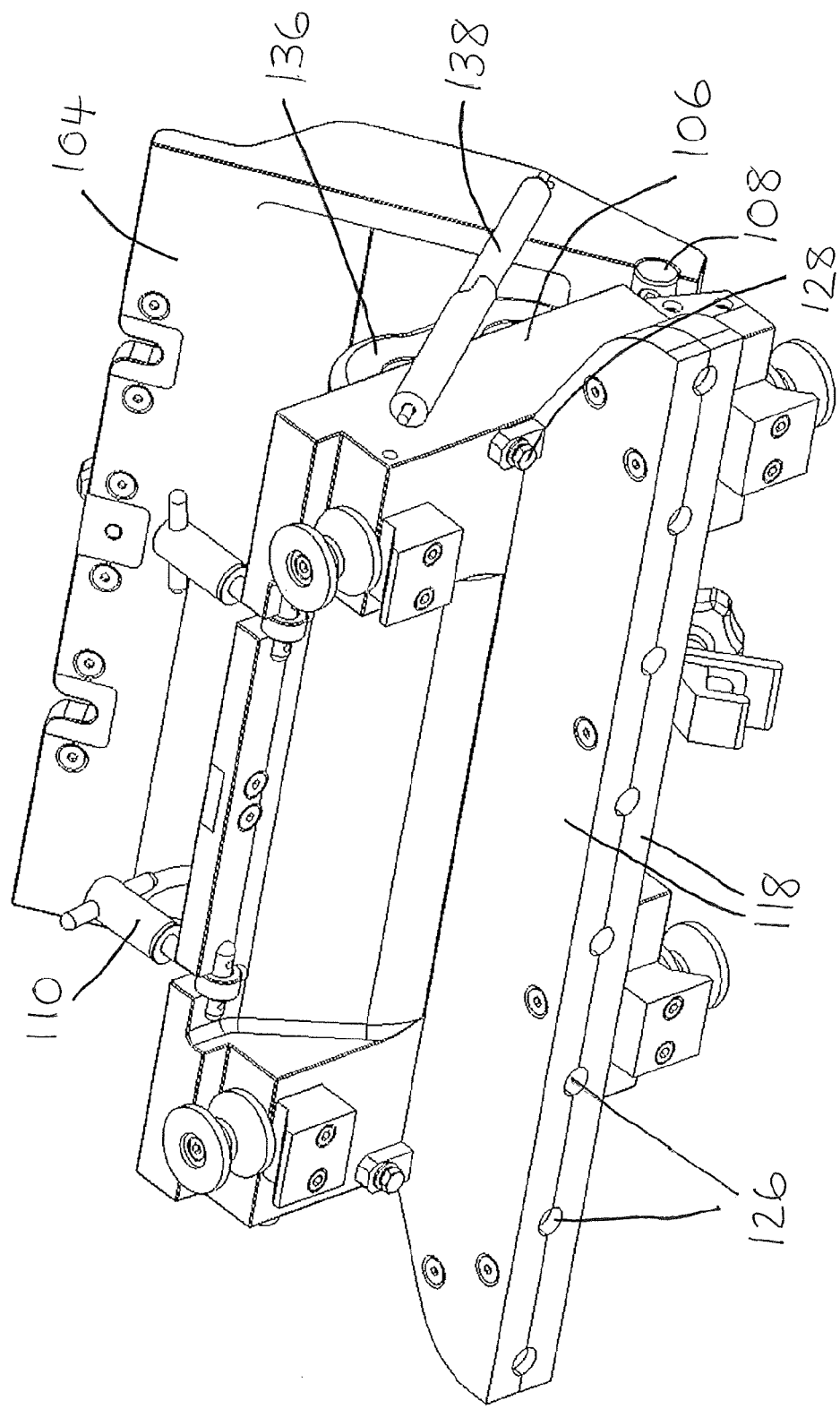

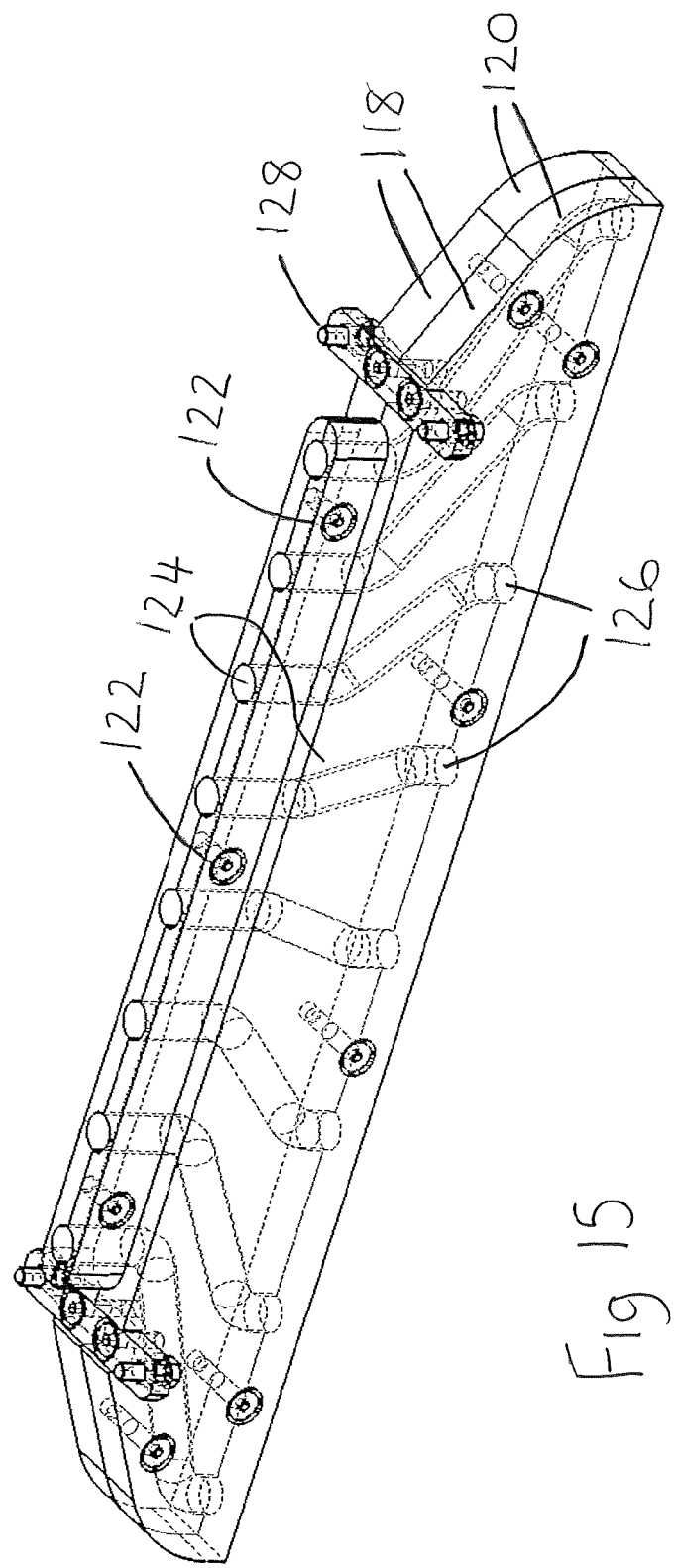

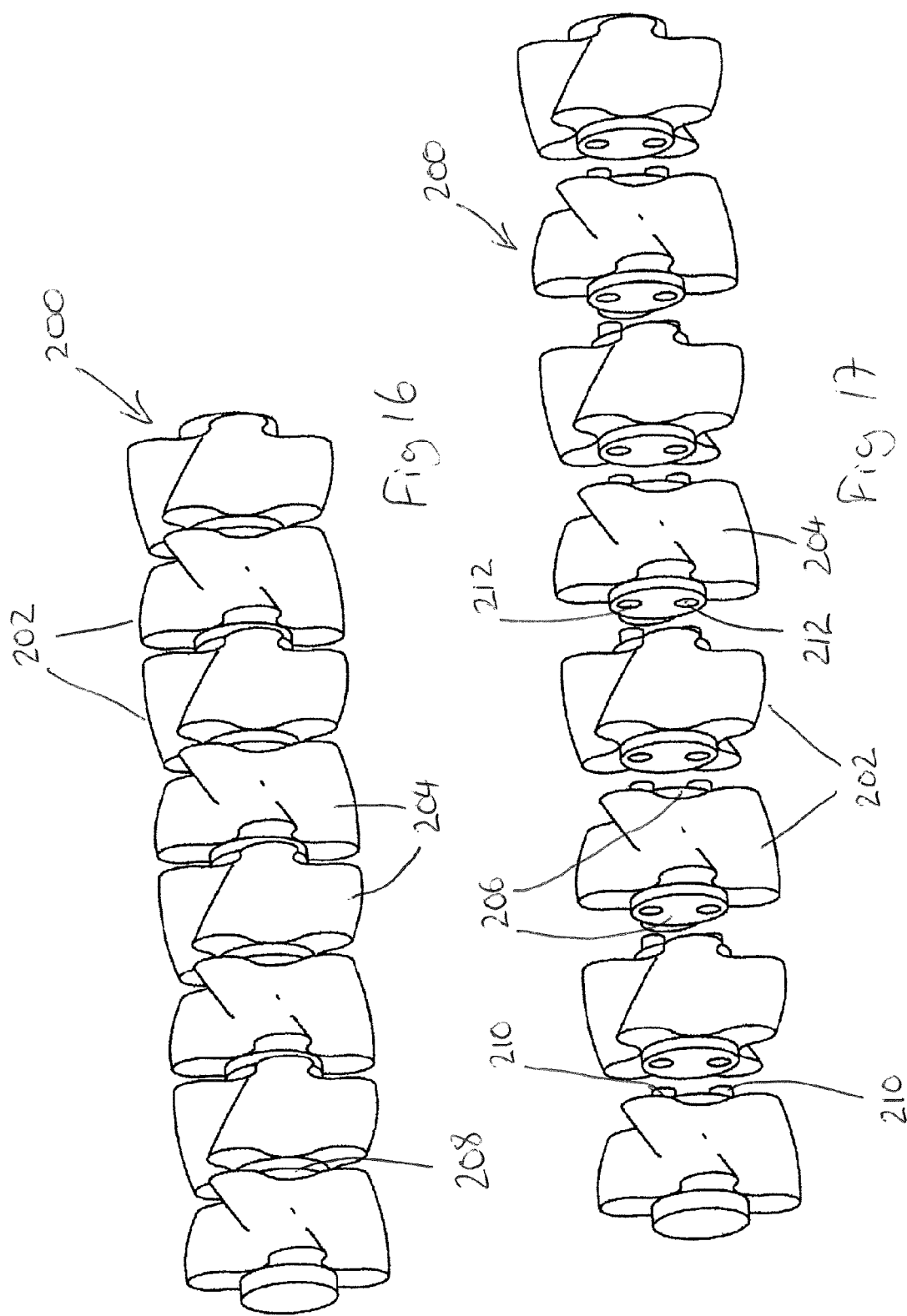

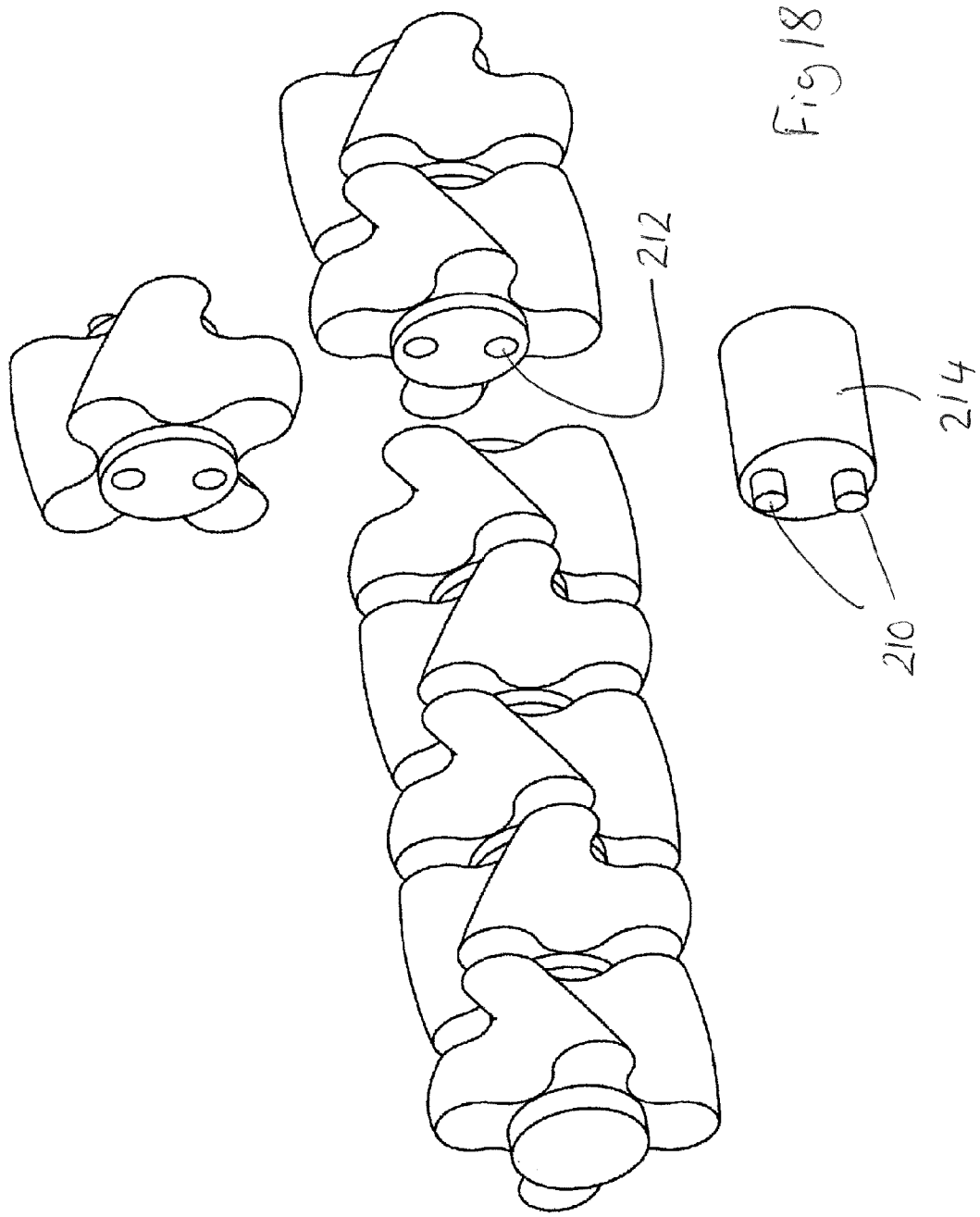

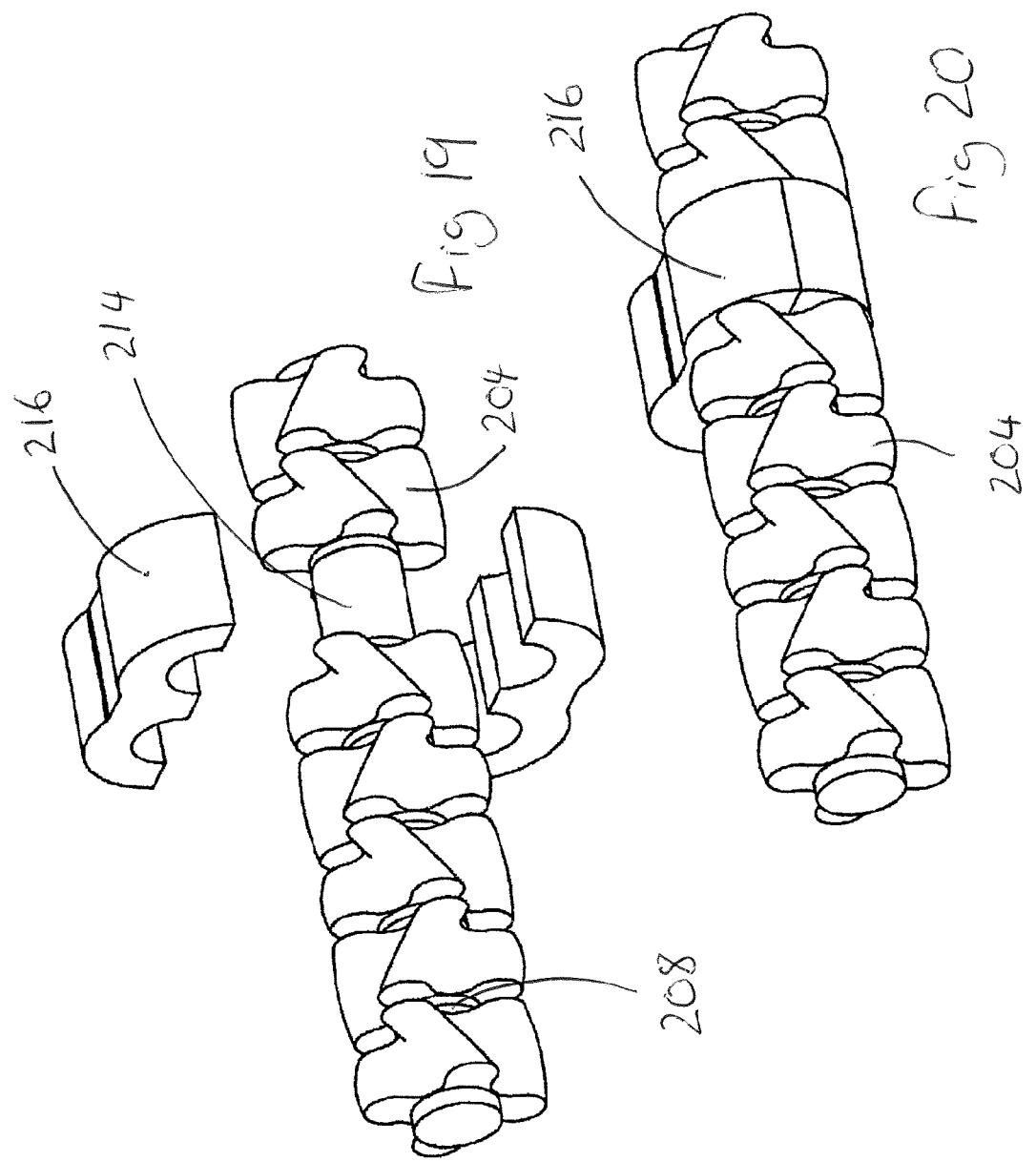

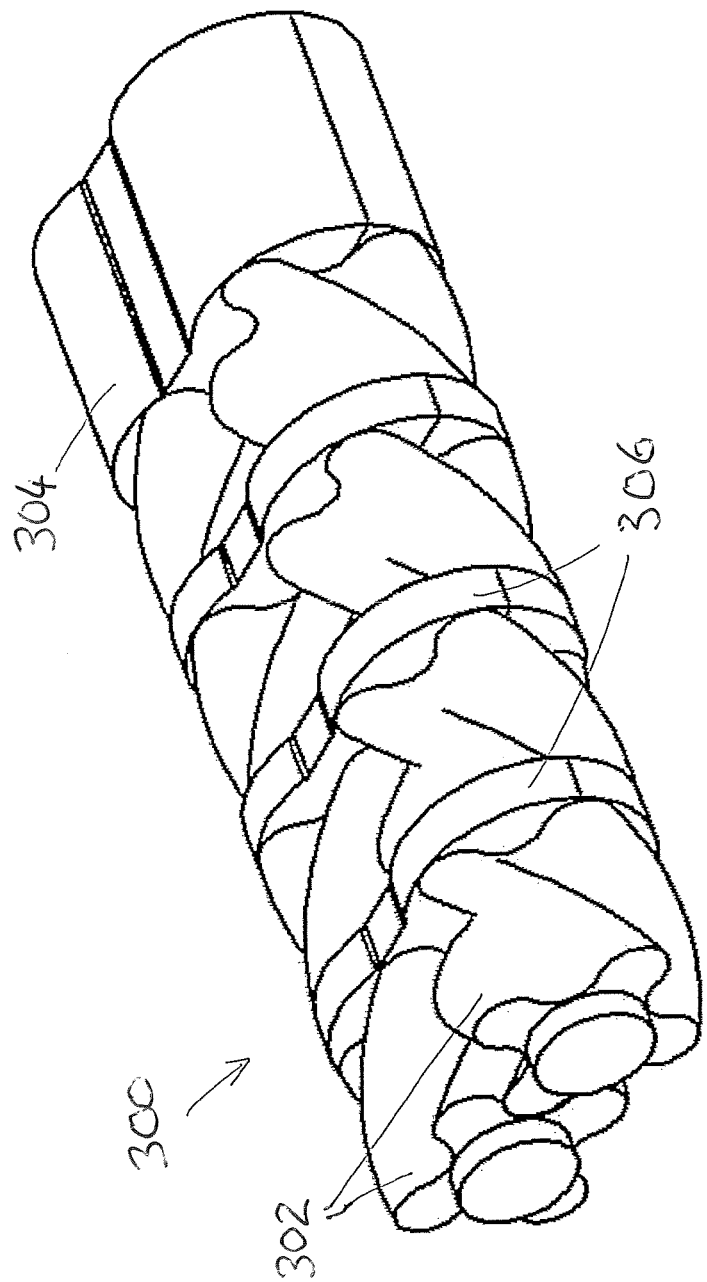

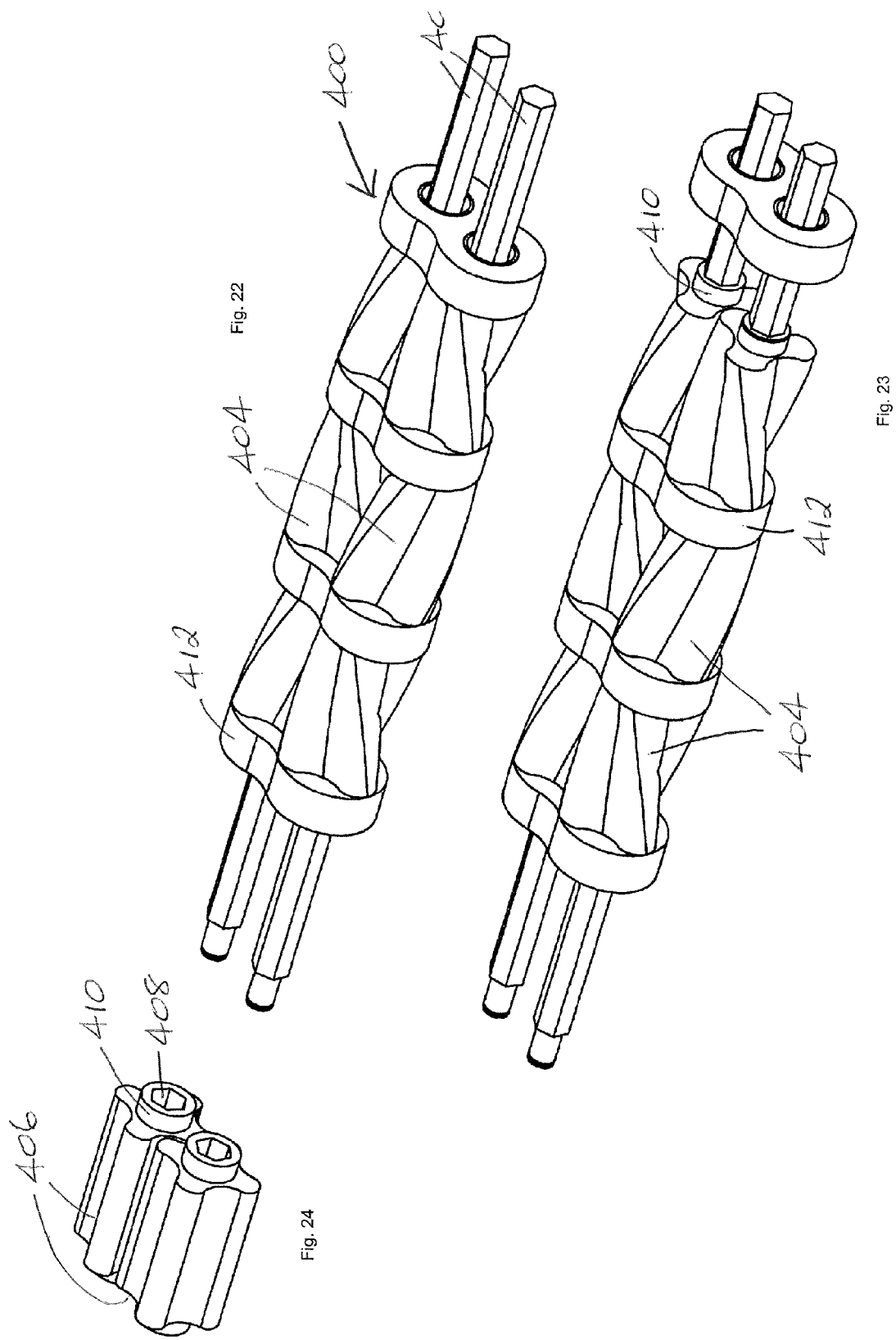

DISTRIBUTOR APPARATUS WITH A PAIR OF INTERMESHING SCREW ROTORS

This invention concerns distributor apparatus, and particularly but not exclusively distributor apparatus usable in the food industry.

This invention relates to distributor apparatus which is apparatus which divides a flowable material into one or more portions or streams of a required volume, which volume may be substantially equal where a plurality of portions or streams are provided, though in some instances portions or streams of different volumes but in constant ratio, may be required or produced. Such apparatus is used for instance in the food industry to divide a filling material such as meat, fruit or other foodstuffs into portions or streams which can be supplied into containers or carriers such as a pie or flan base, or a strip of pastry. A plurality of pie or flan bases, or a complete strip of pastry, may be carried on a conveyor with such a distributor apparatus located thereabove to supply a required feed of filling material thereonto.

With such arrangements it is very important that the minimum filling content for instance for each pie is supplied. If below weight products are supplied this can lead to complaints, perhaps product recalls, and/or even potential prosecution. It is also important though not to have to supply too much filling material. If it is necessary to provide a wide potential margin to ensure that minimum filling content levels are always reached, this can lead to use of excessive filling material and hence additional costs. Therefore in such situations it is important to provide accurate and consistent amounts of filling.

It is also important with such apparatus that it can be readily and thoroughly cleansed. This is obviously a particular requirement in the food industry to maintain hygiene and avoid contamination of product.

According to the present invention there is provided distributor apparatus, the apparatus comprising a pair of adjacent inter engaging rotors such that rotation of one rotor causes or requires rotation of the other rotor in an opposite direction, each rotor comprising a hub with a plurality of lobes extending outwardly therefrom, the rotors being configured such that by virtue of the lobes there is no line of sight between the adjacent inter engaging rotors, an inlet at least generally adjacent to the inter engagement of the rotors such that material entering through the inlet engages with the rotors and is then carried round with the rotors to move in a direction away from the inter engagement of the rotors, the material being located between adjacent lobes on the rotors, an outlet being provided substantially on an opposite side of the rotors from the inlet to receive material after being carried with the rotors.

The rotors may be configured so as to substantially contact each other, and they may contact each other along a line of contact.

The inter engaging rotors may be parallel to each other.

A plurality of spaced inlets may be provided. A plurality of outlets may be provided, and a corresponding outlet may be provided for each inlet.

In one arrangement the outlets are provided by a pair of outlet members which are mountable together with parallel faces of each outlet member engaging against each other, with the outlets defined by recesses extending from in use upper ends to in use lower ends provided in one or both of the parallel faces.

A plurality of adjacent spaces may be defined along the length of the rotors, and a respective inlet and/or outlet may be provided for each space. The apparatus may include a manifold for receiving material, with the inlets extending from the manifold.

Each rotor member may comprise a single axle with a plurality of spaced rotor parts along the length thereof, the rotor parts being interconnected by spacer parts, which spacer parts extend through dividers between the spaces.

The rotor members including the rotor parts and spacer parts may be integrally formed.

Alternatively the rotors may be provided by a plurality of selectively connectable portions. One or more blank portions may be provided which do not provide a rotor part, and a blanking member or members may be provided selectively locatable in a space corresponding to the blank portion.

In one arrangement the rotors may comprise portions with engagement formations thereon, engageable with corresponding engagement formations on adjacent portions such that the portions rotate together with each other.

Each rotor portion may include one or more rotor parts, and part at least part of one or more spacer parts.

A blank portion or portions may be provided which just includes a spacer part or parts.

In a further arrangement the rotors may include a shaft with rotor parts mounted thereon so as to rotate with the shaft. Spacer parts may be provided between the rotor parts. Divider parts may be provided between the rotor parts which are arranged so as to not rotate with the respective shaft.

In one configuration the lobes of the rotors may be helically configured. In further configurations the lobes may be any of conical, convex concave, or parallel.

Where the lobes of the rotors are helically configured, the line of contact may be helical.

The rotors may be freely rotatable, and may be configured such that they can be driven by material entering through into the apparatus. Drive means may be provided for the rotors.

The apparatus may include an enclosure which locates the rotors.

The enclosure may have an upper part which may be made of a single piece of material. The upper part may provide an inlet into the chamber, and may locate a manifold and provide a plurality of inlets into the chamber.

The enclosure may have a lower part with an exit for material. In one arrangement the outlet members are mountable to or adjacent to the lower part, with the outlets in communication with the exit. The lower part may be made from a single piece of material.

In a further arrangement the lower part provides a plurality of outlets leading from the chamber.

The upper and lower parts of the enclosure may be openable to provide access to the chamber. The upper and lower parts of the enclosure may be pivotally mounted together.

In one arrangement a single inlet opening is provided in the upper part, and the opening may be provided substantially centrally.

In a further arrangement inlet openings may be provided in the upper part of the enclosure leading to the manifold, and the inlet openings may be provided at opposite ends of the upper part of the enclosure. Closure means may be provided for selective use in a one of the inlet openings.

The chamber may have a cross sectional profile to rotatingly locate the rotors with minimal clearance to the outermost parts of the lobes. The cross sectional profile of the chamber may comprise two interconnecting circles each locating a respective rotor. The inlets, exit for material, and/or outlets may be provided in outwardly extending recesses at the interconnection between the two circles.

Dividers may be provided locatable in the chamber to divide same into a plurality of spaces, and a respective inlet and outlet may be provided for each space. The dividers may include upper and lower parts, with the rotors locatable between the upper and lower divider parts. The dividers may rotatingly support the rotors.

Ends of the chambers may be profiled to rotatingly support ends of the rotors. Alternatively end most dividers may be provided to rotatingly support ends of the rotors.

Embodiments of the present invention will now be described by way of example only and with reference to the accompanying drawings, in which:

FIG. 12 is a diagrammatic perspective view from beneath of a component of the apparatus of FIG. 11;

FIG. 13 is a perspective view from above of a further component of the apparatus of FIG. 11;

FIG. 14 is a diagrammatic perspective view from beneath of the apparatus of FIG. 11;

FIG. 15 is a diagrammatic perspective view of further components of the apparatus of FIG. 11;

FIG. 16 is a diagrammatic perspective view of a first alternative component usable in the apparatus of FIG. 1 or 11;

FIG. 17 is an exploded perspective view of the component of FIG. 16;

FIGS. 18 to 20 are further diagrammatic perspective views of the component of FIG. 16;

FIG. 21 is a diagrammatic perspective view of second alternative components usable in the apparatus of FIG. 1 or 11;

FIGS. 22 and 23 are diagrammatic perspective views of third alternative components usable in the apparatus of FIG. 1 or 11; and FIG. 24 is a perspective view of further alternative components usable in the apparatus of FIG. 1 or 11.

FIGS. 1-10 of the drawings show a first distributor apparatus 10 suitable for use for instance in the food industry and could be used as an example to supply filling for a product such as a sausage roll.

Figure 9:
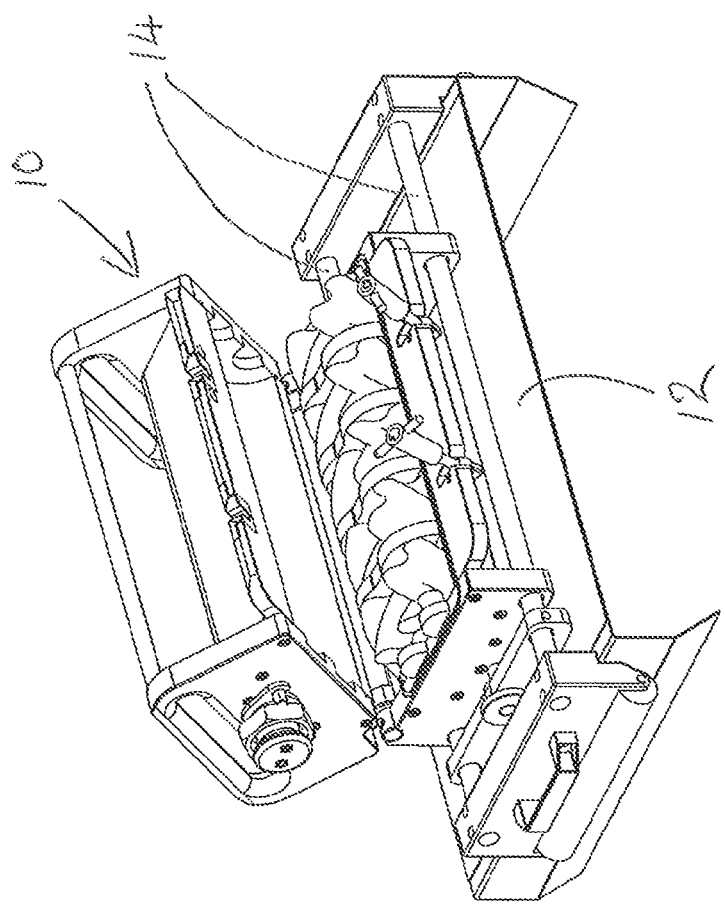
FIG. 9 is a perspective view illustrating how the apparatus of FIG. 1 can be mounted in use.

FIG. 9 shows mounting of the apparatus 10 above a food conveyor 12. The apparatus 10 is mounted on a pair of transverse bars 14 such that the apparatus 10 can be slid to a required position. In the example of forming sausage rolls, a length of pastry could be provided on the conveyor 12 passing beneath the apparatus 10, and a plurality of strips of meat could be provided longitudinally on the pastry. Once an upper such layer of pastry has been applied, the pastry can be cut into appropriate lengths and widths to provide the individual sausage rolls.

The apparatus 10 comprises an enclosure 16 with upper and lower parts 18, 20 which are pivotally interconnected by a hinge arrangement 22 along one side edge. A pair of threaded locking members 24 are provided on the opposite edge of the lower part 20 and can engage with respective slots 26 on the side edge of the upper part 18 to retain the upper and lower parts 18, 20 in a closed condition.

The upper and lower parts 18, 20 together define a profiled chamber 28. When viewed in cross section as can be seen for instance in FIG. 10, the chamber 28 can be seen to have a cross sectional profile largely formed of two interconnecting circles. Upper and lower recesses 30, 32 are provided extending respectively above and below the interconnection between the two circles. A manifold 34 is provided in the upper part 18 which connects to five spaced inlets 36 which each extend from the manifold 34 at spaced locations on the upper edge of the upper recess 30. A plurality of spaced outlets 38 are provided in the lower recess 32 substantially opposite the inlets 36. Discharge nozzles 40 extend downwardly from the outlets 38 for discharging material from the apparatus 10.

Four divider members 42 are provided each with upper and lower sections 44, 46. The divider members 42 can be loosely located in the chamber 28 and are profiled such that their outer faces intimately engage with the walls of the profile chamber 28. Together the upper and lower sections 44, 46 define two spaced circles coaxial with the circles of the profiled chamber 28.

A pair of integrally formed rotors 48, 50 are provided. Each of the rotors 48, 50 comprises five rotor parts 52 divided by circular section spacer parts 54, which are of a size to slidingly locate in the holes defined between the upper and lower sections of the divider members 42. Spacer parts 54 are also provided at each end of the rotors 48, 50, and circular section recesses 56 are provided in the end walls of the profiled chamber 28 of the enclosure 16, to rotatingly receive the end most spacer parts 54.

The rotors 48, 50 have a central core 58 with four lobes 60 extending therefrom. The lobes 60 have a helical configuration along the length of the rotor parts 52. The rotors 48, 50 are opposite handed in relation to the helical lobes 60, and are inter engageable such that rotation of one in a first direction causes or requires the other inter engaged rotor to rotate in an opposite direction. The rotors 48, 50 contact each other substantially along a helical line of contact.

Figure 1:
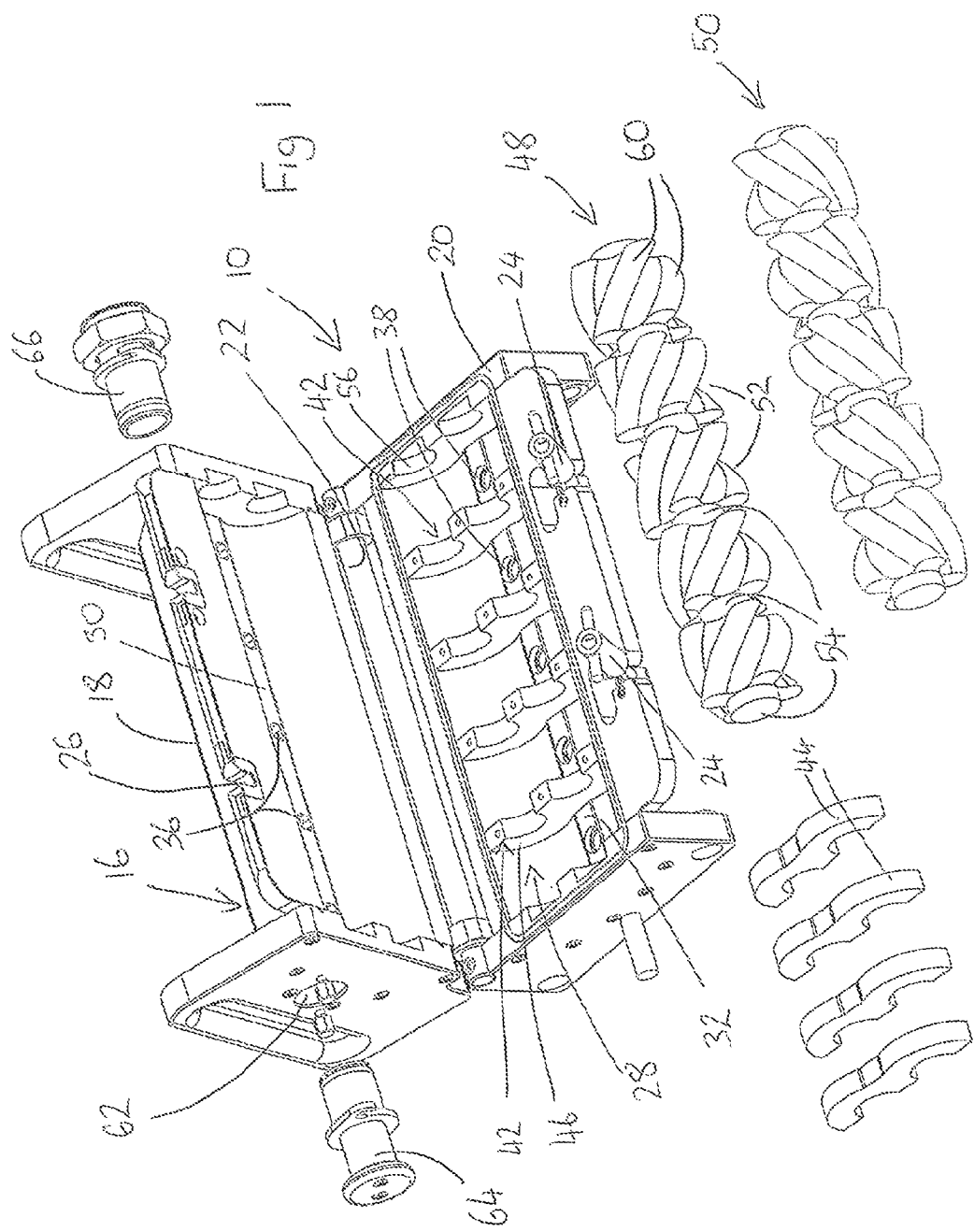
FIG. 1 is a perspective exploded view of a first distributor apparatus according to the invention showing the various components of the apparatus.

Openings 62 are provided extending into the manifold 34 at each end. As can be seen in FIG. 1, a closure 64 can be provided in one end, with an inlet port 66 provided in the other to supply material into the apparatus 10.

Figure 2:
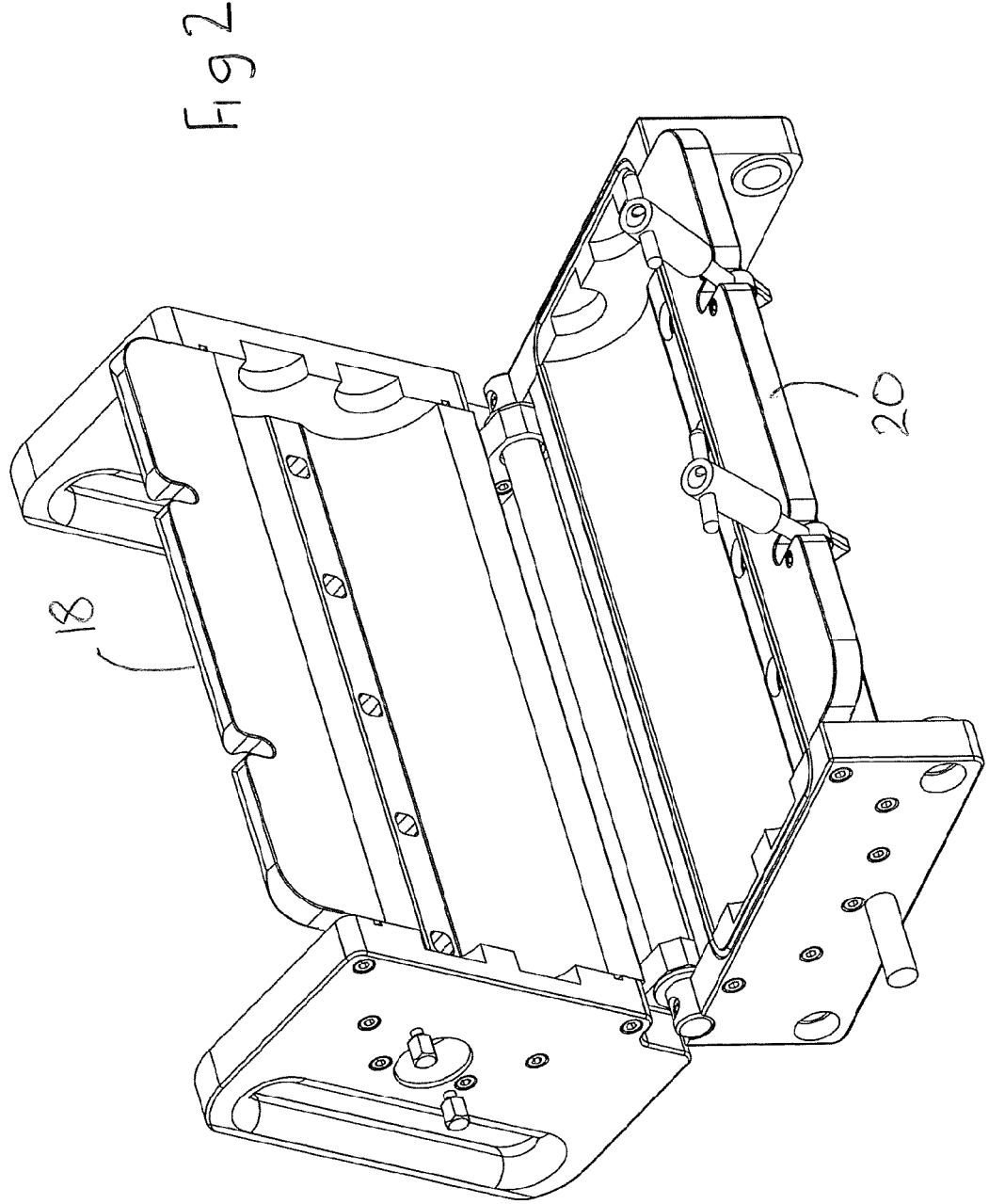
FIGS. 2-8 are similar perspective views to FIG. 1 sequentially showing the components of the first apparatus being assembled.
Figure 3:
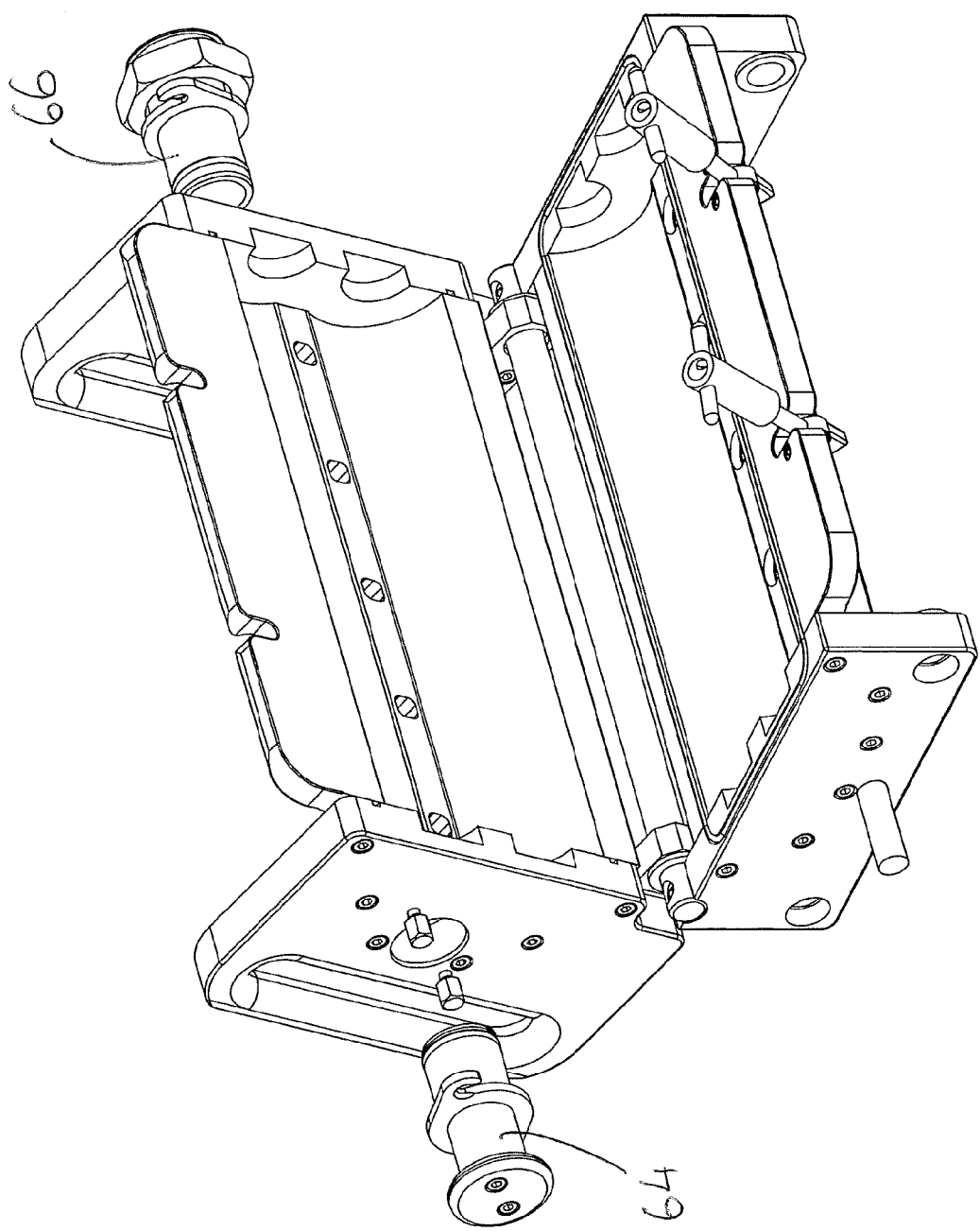

The apparatus 10 can readily be taken apart to permit ready and thorough cleaning. FIGS. 2 to 8 illustrate assembly of the apparatus 10 as could occur for instance after cleaning. FIG. 2 shows the enclosure 16 with the upper part 18 pivoted open relative to the lower part 20. FIG. 3 shows the closure 64 and inlet port 66 being fitted.

Figure 4:
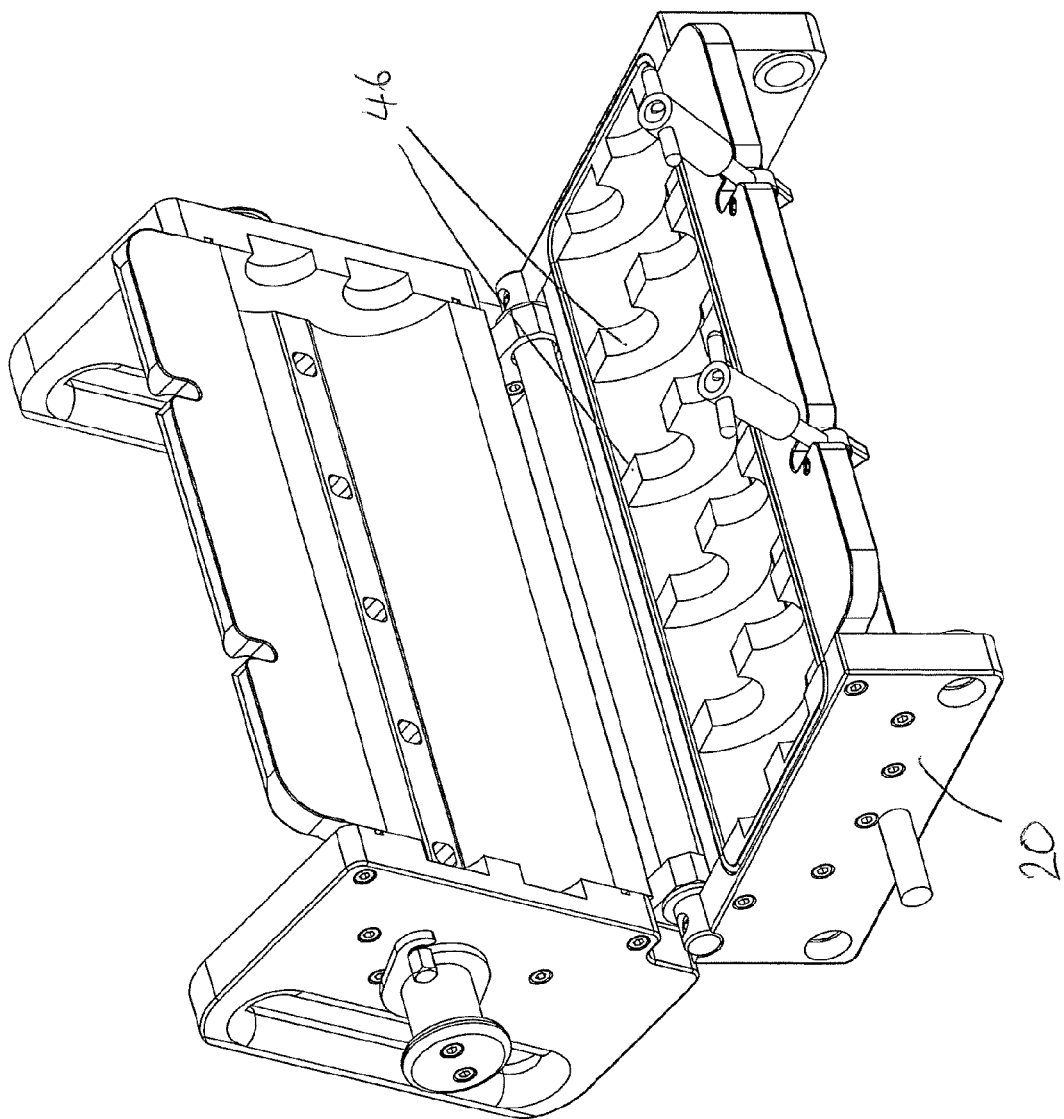
Figure 5:
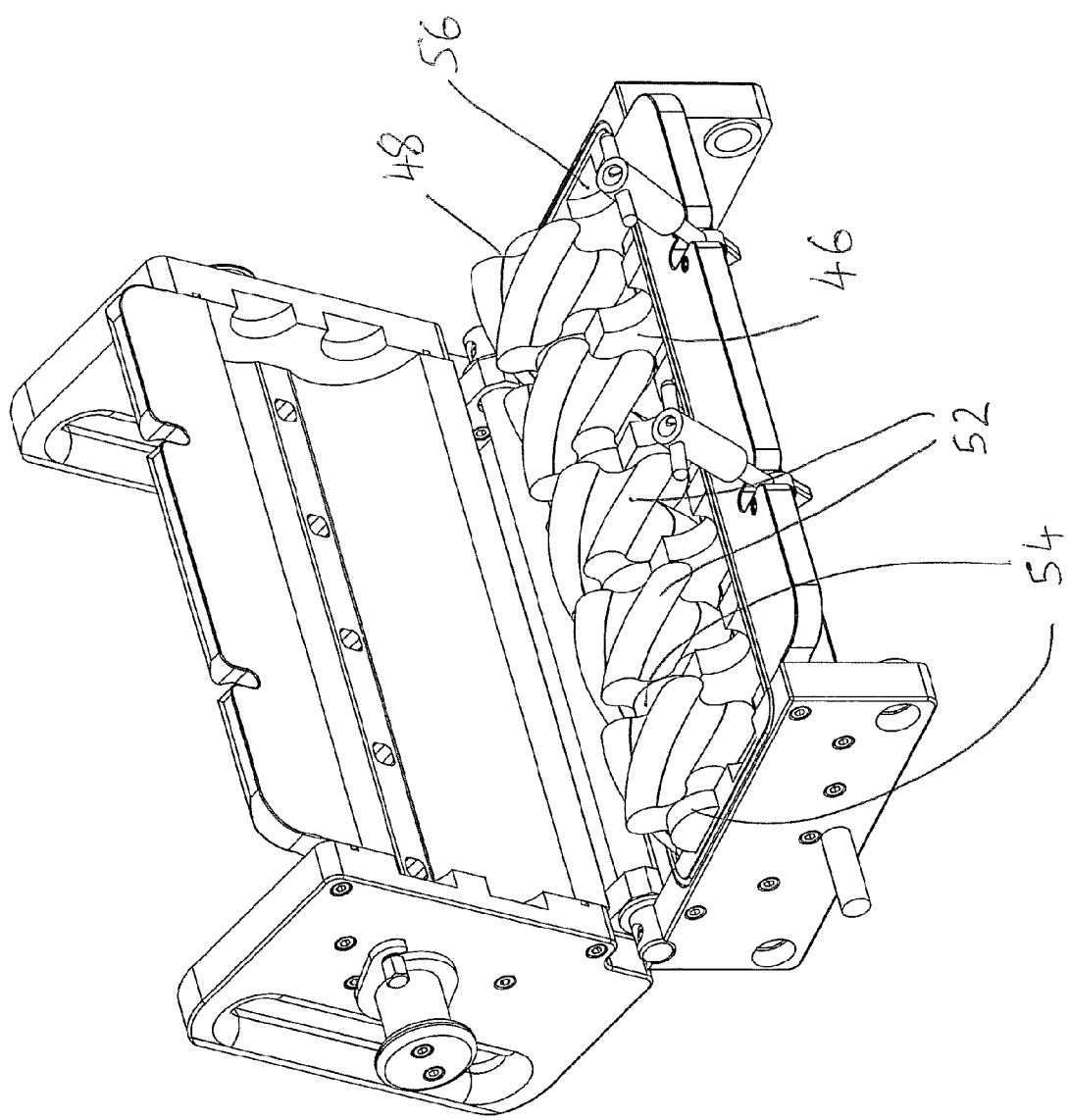

FIG. 4 shows the lower divider sections 46 in position in the lower part 20 dividing same into five spaces. FIG. 5 shows a first of the rotors 48 located in the chamber 28, with the spacer parts 54 locating on the lower divider sections 46, and the end spacer parts 54 located in the recesses 56.

Figure 6:
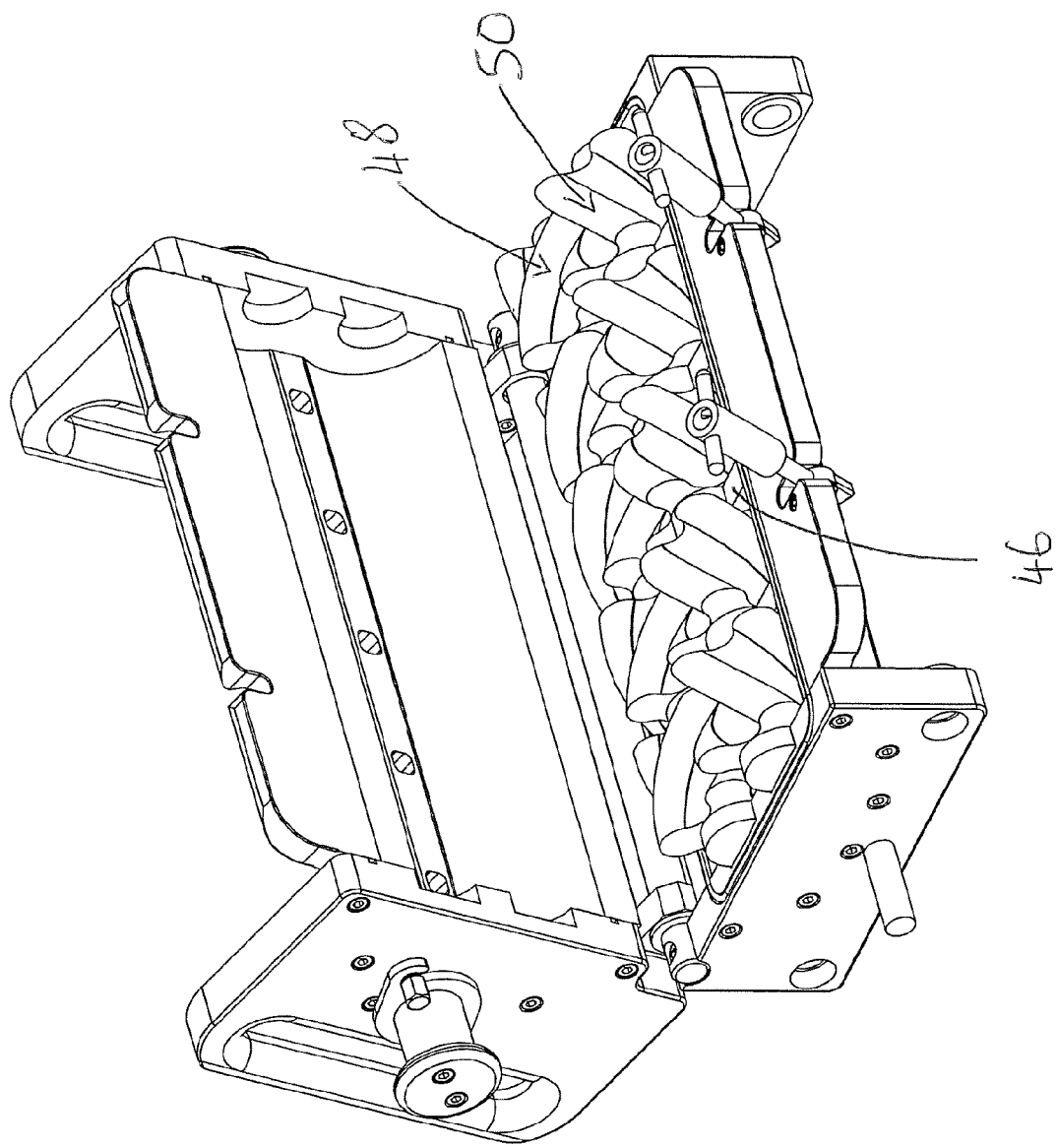
Figure 7:
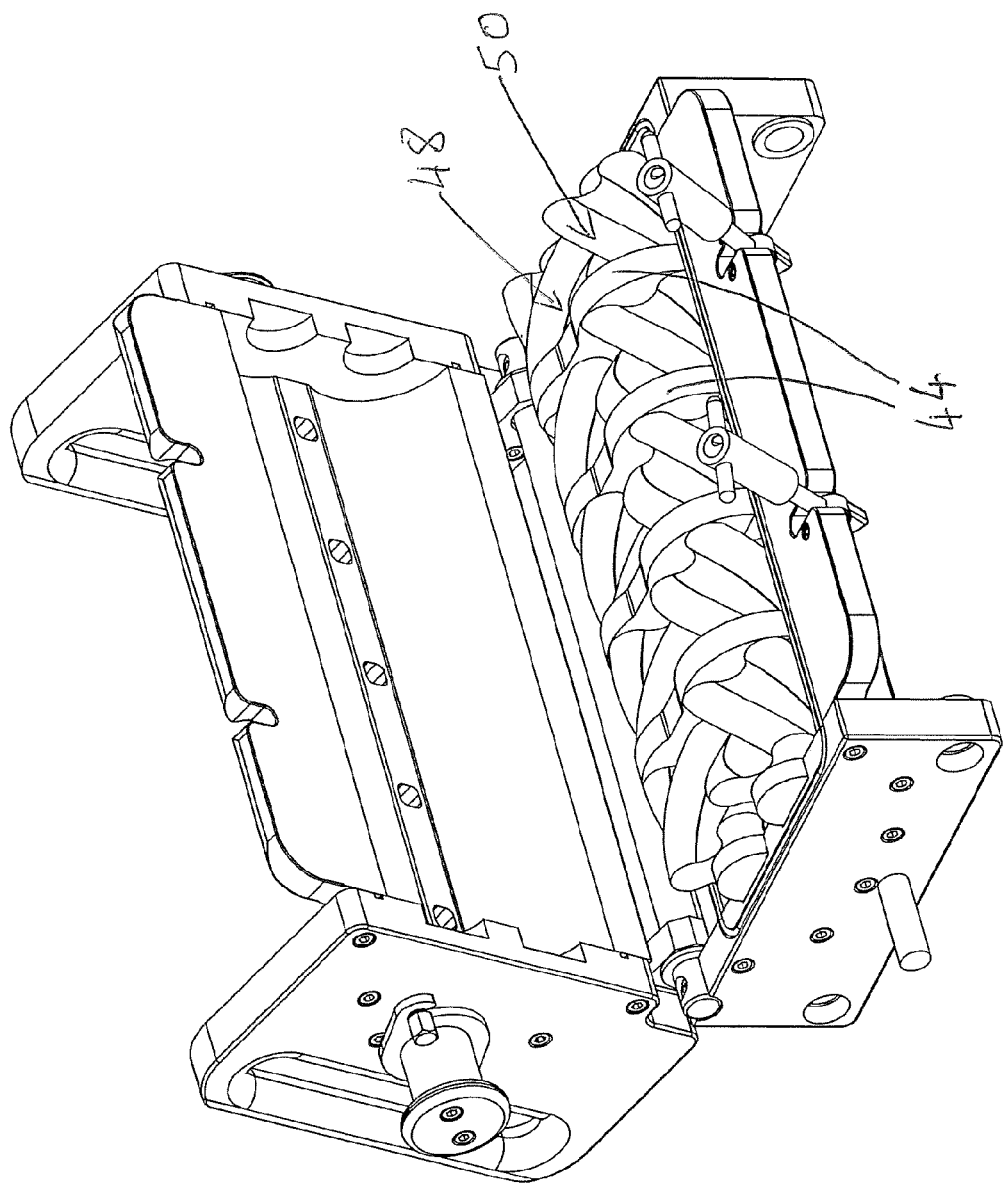

FIG. 6 shows the second rotor 50 located in position supported on the lower divider sections 46 and the recesses 56. In FIG. 7 the upper divider sections 44 are now located on top of the lower divider sections 46 such that the spacer parts 54 are rotatingly located between the upper and lower divider sections 44, 46.

Figure 8:
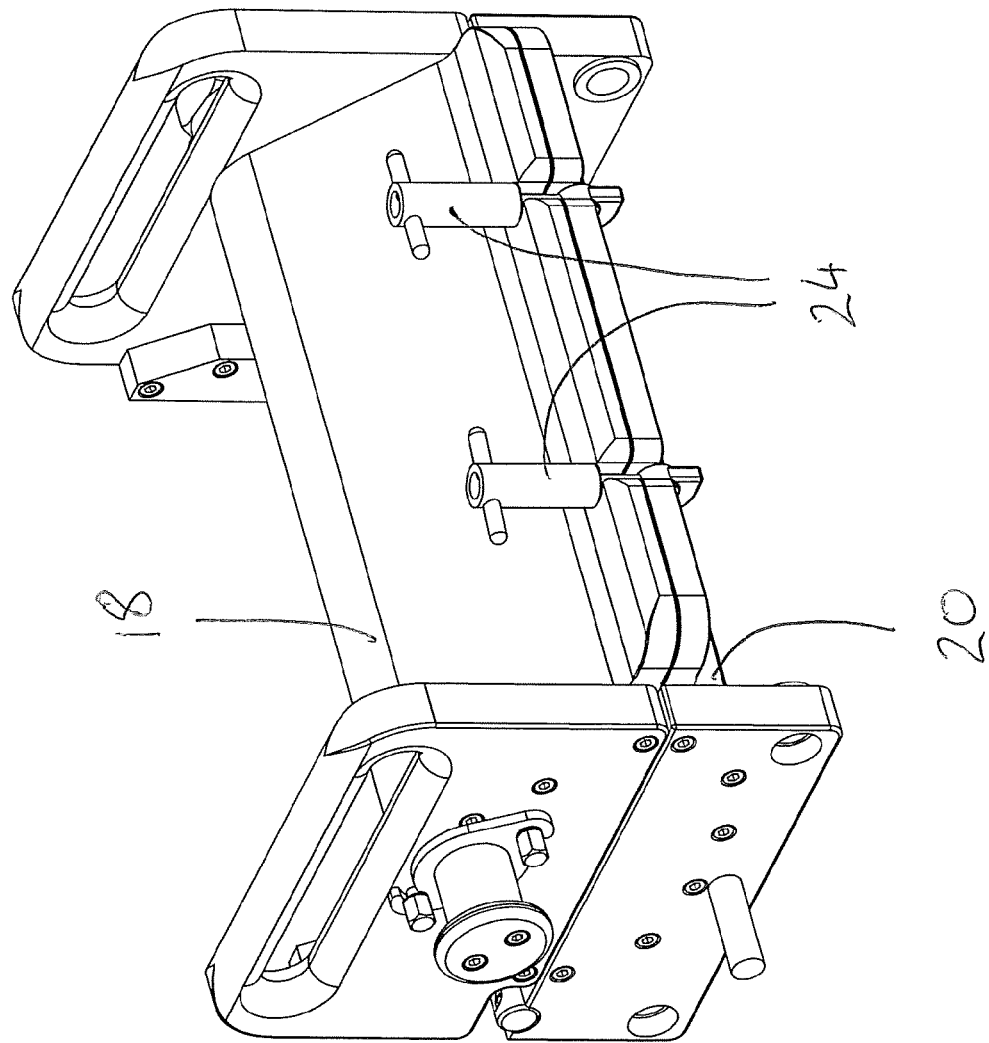

FIG. 8 shows the enclosure now closed with the upper part 18 on top of the lower part 20 and held in position by the locking members 24.

Figure 10:
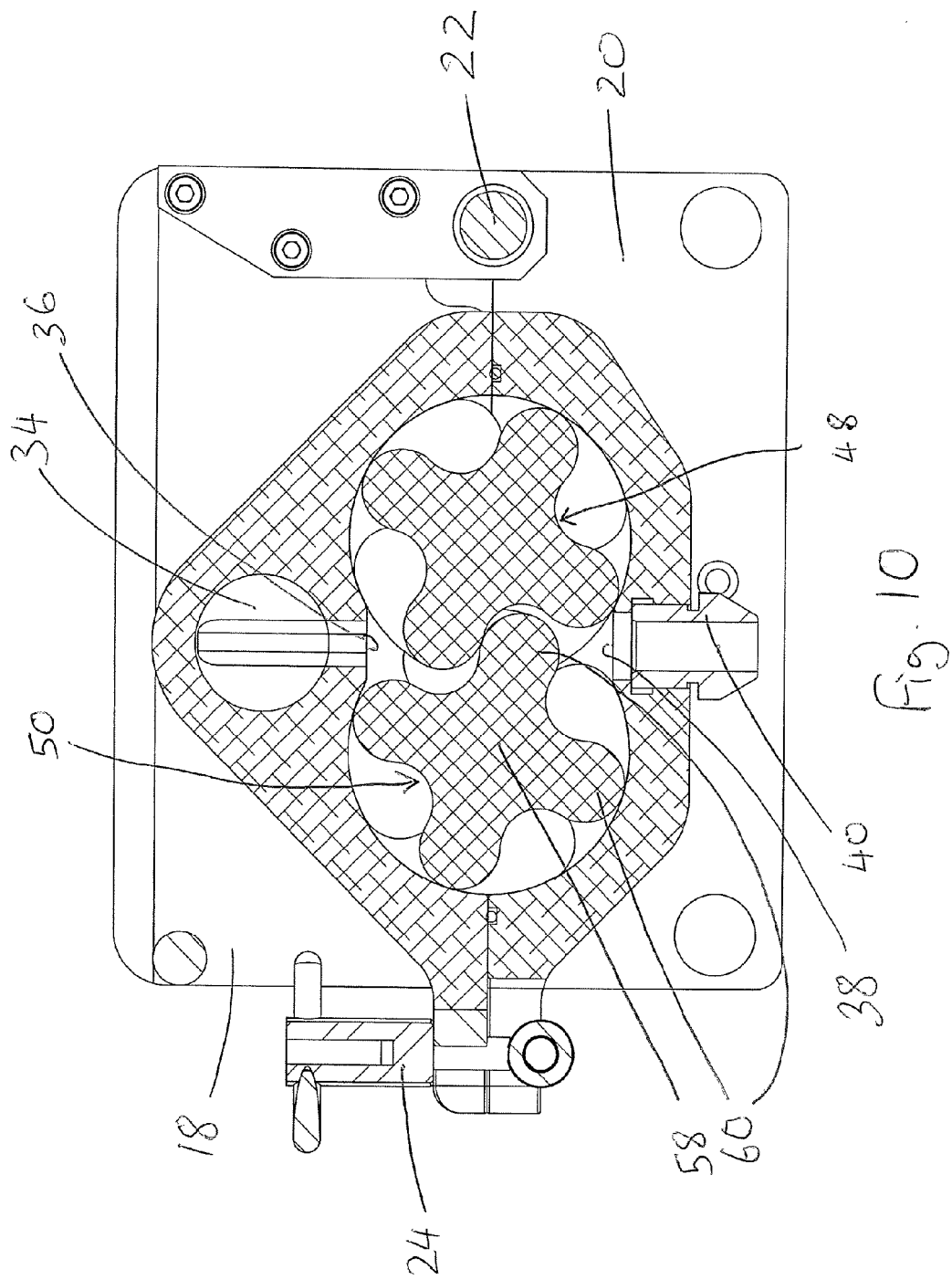
FIG. 10 is a diagrammatic cross sectional view through the apparatus of FIG. 1.

FIG. 10 shows the arrangement of the assembled distributor apparatus 10 which illustrates that there is no line of sight between the rotors 48, 50 for instance when looking downwardly from the inlets 36.

In use, material is pumped through the inlet port 66 into the manifold 34. The material will then exit through the inlets 36 into the chamber 28. The material passes around with the rotors 48, 50, being located between adjacent lobes 60 on the rotors 48, 50, and will cause the rotors 48, 50 to rotate, with the rotor 48 rotating in a clockwise direction and the rotor 50 rotating in an anticlockwise direction. Material will move outwardly around the profiled chamber until it reaches the outlets 38 where it will pass out through the respective discharge nozzle 40 to for instance provide a line of material which could be meat for a sausage roll.

FIGS. 11-15 show a second distributor apparatus 100 which is similar in many respects to the apparatus 10, and only the differences will be described in detail. Again an enclosure 102 is provided with upper and lower parts 104, 106 which are pivotally connected by a hinge arrangement 108. Similar threaded locking members 110 are provided to selectively retain the upper and lower parts 104, 106 in a closed condition.

In this instance the upper part 104 is formed from a single piece of material which in this instance is aluminium. A single central inlet 112 is provided in the upper part 104 to permit material to enter the enclosure 102.

The lower part 106 is also formed from a single piece of aluminium. In this instance a central lower slot 114 is provided which acts as an exit from the enclosure 102. As the upper and lower parts 104, 106 are both formed from a single piece of material they have rounded corners 116.

The outlets are provided by a pair of outlet members 118 which are in the form of plates 120 which are selectively mountable together by bolts 122. On the faces of the plates 120 which face each are semi-circular section recesses 124 which are provided in corresponding patterns on each of the plates 120 to define outlets 126 as best shown in FIG. 15. As shown an arrangement is provided with eight outlets 126. The outlet members 118 are selectively mountable on the underside of the lower part 106 by bolts 128.

It is to be realised that the outlet members 118 can readily be removed from the lower part 106 for cleaning, and also to permit outlet members of a different pattern and perhaps with a different number of outlets to be mounted thereto.

Figure 11:
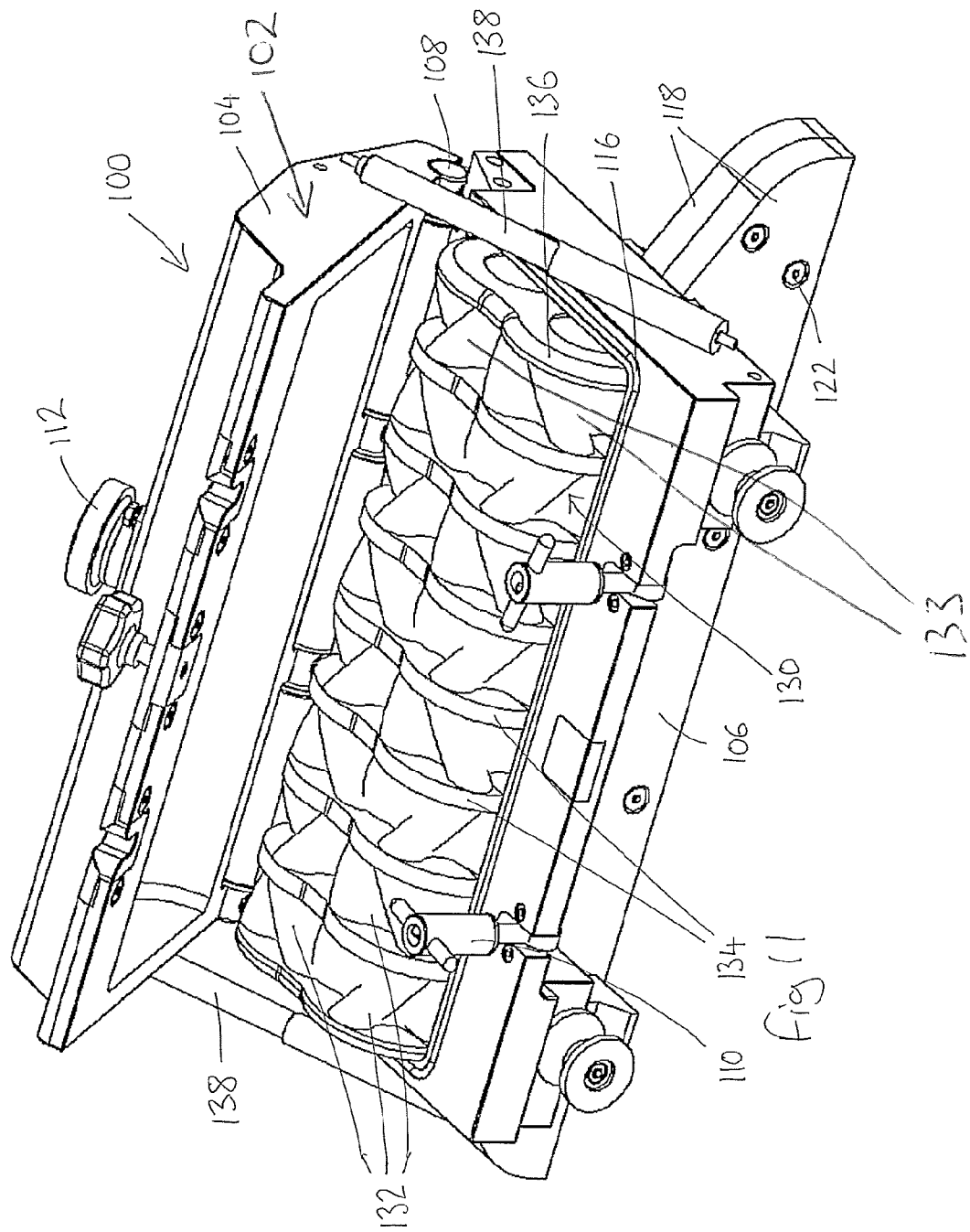
FIG. 11 is a diagrammatic perspective view of a second distributor apparatus according to the invention.

FIG. 11 shows the enclosure 102 with a rotor arrangement 130 mounted therein. The arrangement 130 comprises two integral rotors 132 with eight rotor parts 133 separated by respective spacer parts (not visible). The rotors 132 are locatable on the respective interconnecting circles as for the apparatus 10. Each pair of rotor parts 133 corresponds to a one of the outlets 126. Located axially between each pair of rotor parts 133 is a respective divider 134 which is appropriately profiled as shown. The dividers 136 at each end have rounded outer ends to correspond to the rounded corners 116 of the upper and lower parts 104, 106. The end dividers 136 rotatingly support respective spacer parts provided at each end of the rotors 132. A telescopic strut 138 extends between the upper and lower parts 104, 106.

In use the apparatus 100 will operate in a similar way to the apparatus 10. The apparatus 100 readily permits different rotors to be mounted. In the same enclosure 102, and if for instance rotors with a different number of rotor parts and respective dividers were used, a corresponding pair of outlet members 118 could be selectively mounted on the lower part 106.

Again with the rotors 132 and dividers 134 readily removable from the enclosure 102, and with the rounded corners 116, this means that the apparatus 100 can readily be washed, and there are a reduced number of areas for potential contamination.

FIGS. 16 to 20 show an alternative rotor 200. In this instance the rotor 200 comprises eight selectively connectable components 202. Each component 202 comprises a helical rotor part 204 with respective halves of adjacent spacer parts 208. The spacer part halves 206 each include engagement formations which in this instance are on a one half 206 a pair of diametrically opposite projections 210 and on the other half 206 corresponding openings 212. The projections and openings 210, 212 can engage with each other to form a complete rotor 200 as shown in FIG. 16.

FIGS. 18 to 20 show a blanking component 214 which can replace any one of the rotor components 202. The blanking component 214 is of the same diameter as the spacer parts 208 for its entire length, and again is provided with projections 210 and openings 212 at respective ends.

FIGS. 19 and 20 show a blanking member 216 formed in two halves which are of a size to substantially fill the space defined between a pair of dividers, to for instance turn what would be an eight lane apparatus into a seven lane apparatus. Obviously the blanking components 214 and blanking members 216 can be used in any required positions. In some instances components may be formed which comprise a plurality of permanently connected or integrally formed rotor parts 204 and spacer parts 208.

FIG. 21 shows a further pair of rotors 300 which are similar to the rotor 200 except that this is for use in for instance a five lane apparatus. Here four rotor parts 302 are provided with an end blanking component which is not visible as it is surrounded by a blanking member 304. The dividers 306 are shown in FIG. 21.

FIGS. 22 to 24 show an alternative rotor arrangement 400. In this instance each rotor 402 includes a hexagonal cross section shaft 402 which mounts rotor parts which can be helical as shown by the rotor parts 404 in FIG. 22 or 23, or could for instance not have any helical formation as shown by the rotor parts 406 in FIG. 24.

The rotor parts 404, 406 have a hexagonal opening 408 such that the rotor parts 404, 406 slidingly fit on the shaft 402 so as to be rotatable therewith. Circular section projections 410 are provided at each end of the rotor parts 404, 406 to provide the spacer parts.

Dividers 412 are shown which have a generally "8" shape cross section profile so as to slidingly fit over the projections 410 such that the rotor parts 406 can rotate relative to the dividers 412. With such an arrangement it is to be realised that any required number and/or shape of rotor parts can be used as required.

These arrangements, and particularly with the helical lobes, have been found to provide a very consistent flow of material through the outlets. The helical lobes always mean that there is a space between the lobes opposite the inlets and outlets, thereby avoiding pulsing of material. The common axle of the rotors means that they all turn at the same speed and supply the same amount of material.

The inter engaging rotors and their interaction with the profiled chamber, effectively means that the outlets are isolated from the inlet or inlets.

In these examples the rotors are driven by the flow of material passing through the apparatus. In some instances it may be required to drive the rotors. This could particularly be the case when filling individual items such as pies etc., where material is only required to be delivered when for instance a row of pie bases is located beneath the respective outlet.

There is thus described distributor apparatus which has been found to provide very accurate and consistent flow of material. Using helical rotors prevents pulses of material. This is achieved by a constant amount of flow of material for any incremental rotation of the rotors. The apparatus can also readily be disassembled to permit cleaning and/or any replacement of components which may be required.

Various other modifications may be made without departing from the scope of the invention. For instance whilst the above examples relate to providing a plurality of streams of material, apparatus according to the invention could be used to provide single portions. The enclosure could take a different form. The rotors may take a different form. The lobes could for instance have a different arrangement other than helical, and could for instance be convex or concave, conical, parallel or any other functional geometry. Where the rotor parts are mounted on shafts, the shafts may be other than hexagonal, and could for instance be square.

In some instances it may not be required for the same flow of material to be provided from each outlet, and the rotors could be configured correspondingly, relative to the flow required through each outlet. The rotors may be configured to provide different flow rates in precise ratio. A different number of inlets and/or outlets, and the number and/or positioning of the inlets and outlets, need not correspond to each other. In some instances the rotors may not be parallel to each other.

Whilst the above examples have been described in relation to foodstuffs, such apparatus could be used in a wide range of fields with flowable material requiring to be accurately dispensed.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A distributor apparatus, the apparatus comprising:
a pair of adjacent inter engaging rotors such that rotation of one rotor causes or requires rotation of the other rotor in an opposite direction, each rotor comprising a hub with a plurality of lobes extending outwardly therefrom, the rotors being configured such that by virtue of the lobes there is no line of sight between the adjacent inter engaging rotors;
an inlet at least generally adjacent to the inter engagement of the rotors such that material entering through the inlet engages with the rotors and is then carried round with the rotors to move in a direction away from the inter engagement of the rotors, the material being located between adjacent lobes on the rotors; and
an outlet being provided substantially on an opposite side of the rotors from the inlet to receive material after being carried with the rotors wherein a plurality of adjacent spaces are defined along a length of the rotors, and each rotor member comprises a single axle with a plurality of spaced parts along the length thereof, the rotor parts being interconnected by the spaced parts, in which the spaced parts extend through dividers between spaces.

2. The distributor apparatus according to claim 1, wherein the rotors are configured so as to substantially contact each other.

3. The distributor apparatus according to claim 2, wherein the rotors contact each other along a line of contact.

4. The distributor apparatus according to claim 1, wherein the inter engaging rotors are parallel to each other.

5. The distributor apparatus according to claim 1, further comprising a plurality of spaced inlets.

6. The distributor apparatus according to claim 5, further comprising a manifold for receiving material, and wherein the inlets extend from the manifold.

7. The distributor apparatus according to claim 1, further comprising a plurality of outlets.

8. The distributor apparatus according to claim 7, further comprising a plurality of spaced inlets, and a corresponding outlet is provided for each inlet.

9. The distributor apparatus according to claim 7, wherein the outlets are provided by a pair of outlet members which are mountable together with parallel faces of each outlet member engaging against each other, with the outlets defined by recesses extending from in use upper ends to in use lower ends provided in one or both of the parallel faces.

10. The distributor apparatus according to claim 1, further comprising a plurality of outlets and spaced inlets, and at least one inlet or outlet is provided for each space.

11. The distributor apparatus according to claim 1, wherein the rotor members including the rotor parts and spacer parts are integrally formed.

12. The distributor apparatus according to claim 1, wherein the rotors are provided by a plurality of selectively connectable portions.

13. The distributor apparatus according to claim 12, further comprising one or more blank portions that lack a rotor part.

14. The distributor apparatus according to claim 13, further comprising one or more blanking members that are selectively locatable in a space corresponding to the blank portion.

15. The distributor apparatus according to claim 12, wherein the rotors comprise portions with engagement formations thereon, engageable with corresponding engagement formations on adjacent portions such that the portions rotate together with each other.

16. The distributor apparatus according to claim 15, wherein each rotor portion includes one or more rotor parts and at least part of one or more spacer parts.

17. The distributor apparatus according to claim 15, further comprising one or more blank portions that are include one or more spacer parts.

18. The distributor apparatus according to claim 1, wherein the rotor includes a shaft with rotor parts mounted thereon so as to rotate with the shaft.

* * * * *